Sept. 22, 1970  J. H. GOETZ ET AL  3,529,832
SOUND ILLUSTRATED BOOK

Filed Feb. 8, 1968  3 Sheets-Sheet 1

INVENTORS
JOHN H. GOETZ
MICHAEL E. GOLDEN
WILLARD L. ZEIGNER
ADOLPHUS L. LEE

ATTORNEYS

Sept. 22, 1970   J. H. GOETZ ET AL   3,529,832
SOUND ILLUSTRATED BOOK

Filed Feb. 8, 1968   3 Sheets-Sheet 2

INVENTORS
JOHN H. GOETZ
MICHAEL E. GOLDEN
WILLARD L. ZEIGNER
ADOLPHUS L. LEE

BY Aezig Walsh & Blackman
ATTORNEYS

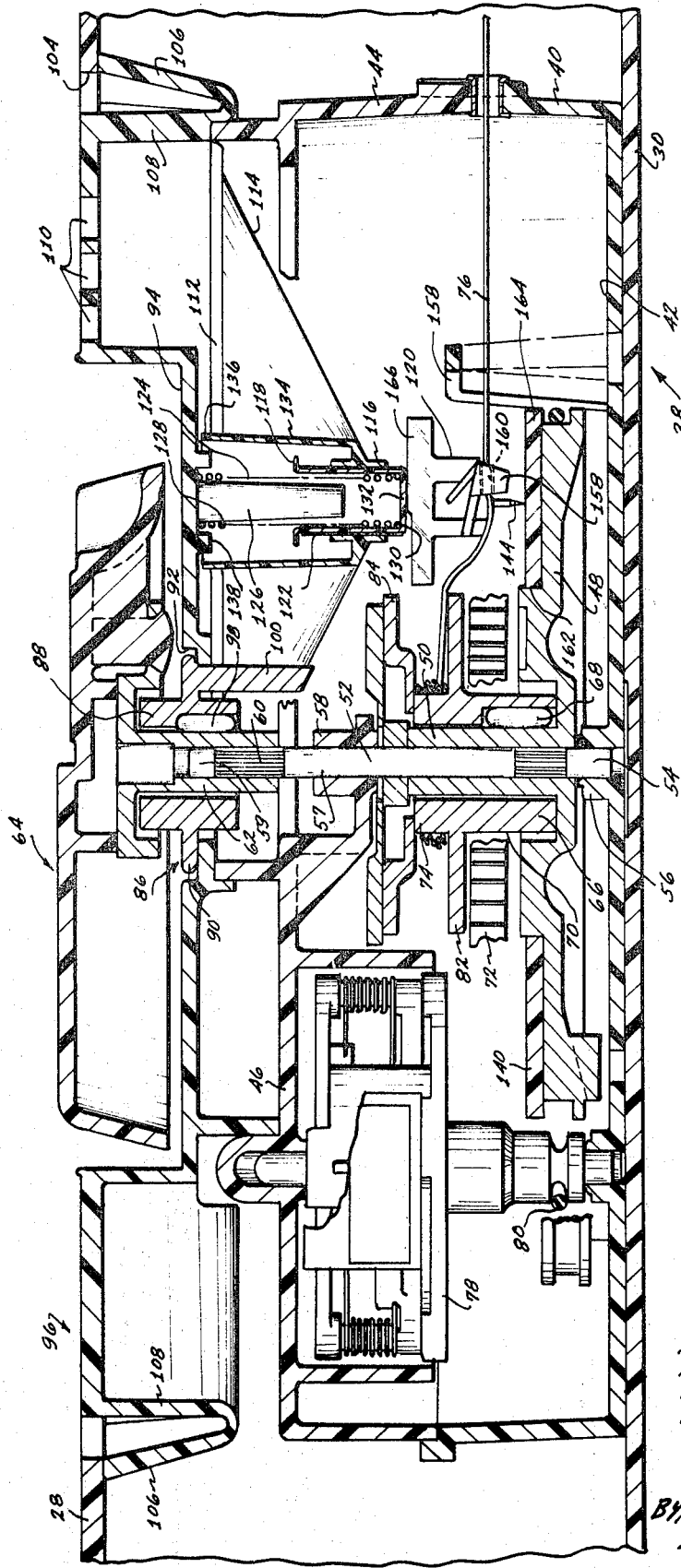

United States Patent Office 3,529,832
Patented Sept. 22, 1970

3,529,832
SOUND ILLUSTRATED BOOK
John H. Goetz, Sherman Oaks, Michael E. Golden and Adolphus L. Lee, Los Angeles, and Willard L. Zeigner, Fountain Valley, Calif., assignors to Mattel, Inc., Hawthorne, Calif., a corporation of California
Filed Feb. 8, 1968, Ser. No. 704,045
Int. Cl. G11b 3/00
U.S. Cl. 274—1                                 7 Claims

ABSTRACT OF THE DISCLOSURE

Indicator means for preconditioning sound reproducing to play recorded messages corresponding to printed matter on each page is rotatably mounted in juxtaposed page-apertures bearing indicia with which indicator means may be aligned to indicate that sound reproducing means is preconditioned to reproduce recorded message corresponding to printed matter on a particular page.

BACKGROUND OF THE INVENTION

The background of the invention will be set forth in two parts:

Field of the invention

The present invention pertains generally to the field of sound illustrated books and more particularly to an improved sound illustrated book which is economical to produce and use and which has improved sound reproducing means, indicator means for preconditioning the sound reproducing means, aperture means provided in each page of the book and indicia means associated with each aperture means.

Description of the prior art

U.S. Pat. No. 3,086,297 discloses a talking book including a suitcase-type housing which is provided with a mounting for a book on one of its large sides. An electrically operated phonograph is provided inside the housing and includes a control mechanism having a lever extending through the top of the housing adjacent one edge of the book. The lever may be positioned along said one edge in coordination with an index printed on the adjacent marginal portion of the book pages. Words are recorded in sections on the record separated by blank portions. A link connects the lever to the pick-up head so that it is lifted from the record whenever the lever is lifted and is moved laterally across the record by manipulation of the lever. A lost-motion connection is provided between the lever and the pick-up head to permit movement thereof as the record turns while the lever remains stationary.

Talking books of the type disclosed in this patent have the disadvantages that they are somewhat expensive and complicated for use as a toy item and, being battery operated, they are somewhat expensive to use.

SUMMARY OF THE INVENTION

In view of the foregoing factors and conditions characteristic of talking books, it is a primary object of the present invention to provide a new and improved sound illustrated book not subject to the disadvantages enumerated above and having improved sound reproducing means and improved indicator means connected to the sound reproducing means for preconditioning it.

Another object of the present invention is to provide an improved book in combination with an improved sound reproducing means.

Yet another object of the present invention is to provide a sound illustrated book of the type described which is especially adapted for use by very young children safely, efficiently and expeditiously.

A further object of the present invention is to provide a sound illustrated book of the type described which employs a mechanical sound reproducing device.

According to the present invention, a sound illustrated book having pictorial representations of real or imaginary things and printed matter related to the pictorial representations includes individual pages. Each page is provided with an aperture which is located in the same relative position as the apertures on the other pages.

Indicia means is provided on each page adjacent its associated aperture means in a predetermined angular position. A sound reproducing means is mounted in the book and has recorded messages provided thereon in a predetermined sequence. The recorded messages include a separate message reciting the printed matter and containing sounds indicative of the subject matter of the pictorial representations. Indicator means is connected to the sound reproducing means for preconditioning it to play one of the messages when the sound reproducing means is energized. The indicator means is positioned within the aperture means on the pages so that it may be aligned with the indicia means. The angular location of the indicia means is such that, when the indicator means is rotated into alignment with a particular indicia means, the sound reproducing means will be preconditioned to play the printed message, and emit sounds characteristic of the pictorial representation, provided on the page bearing the particular indica means.

The sound reproducing means is of the mechanical, spring-wound type including a speaker cone having a piston biased into engagement with a tone arm. The piston is mounted inside a cylinder which, in turn, forms part of a speaker cone. The cylinder includes a shroud sealing the piston from dirt which usually accumulates in toy phonographs used by small children.

The sound reproducing means includes a phonograph record of the multiple-speech type disclosed in U.S. Pat. No. 3,017,187.

A clutching means of the type disclosed in copending application Ser. No. 452,107, filed Apr. 30, 1965, now Pat. No. 3,383,114 connects the phonograph record to the indicator means in such a manner that a child-user of the device may position the indicator means adjacent a predetermined indicium and simultaneously position the phonograph record in such a manner that a predetermined sound sequence will be played when the sound reproducing means is energized. The disclosure of Pat. No. 3,383,-114 is incorporated herein by reference.

The feature of the present invention which are believed to be novel are set forth with particularly in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 3 is a cross-sectional view taken along line 3—3 of FIG. 2; and

DESCRIPTION OF THE PREFERRED EMBODIMENT

Figure 1:
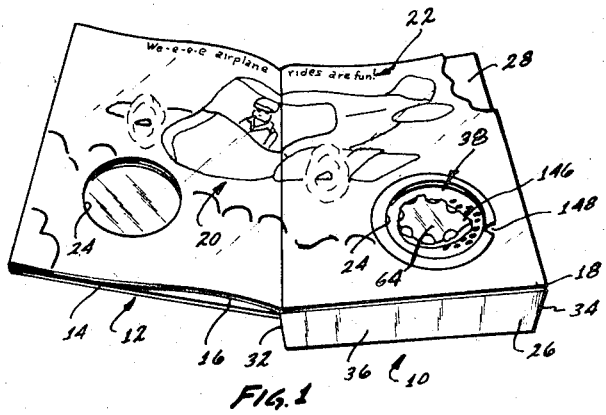
FIG. 1 is a perspective view of a sound illustrated book constituting a presently preferred embodiment of the invention.
Figure 4:
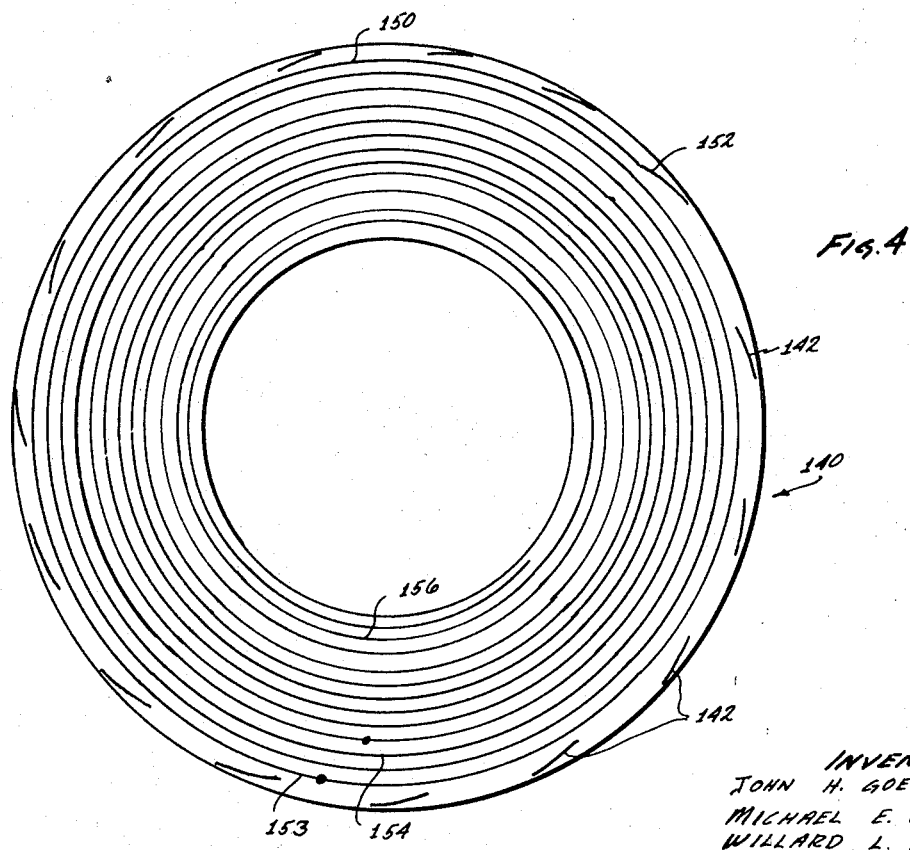
FIG. 4 is a reduced plan view of a phonograph record shown in the device in FIG. 3.
Figure 2:
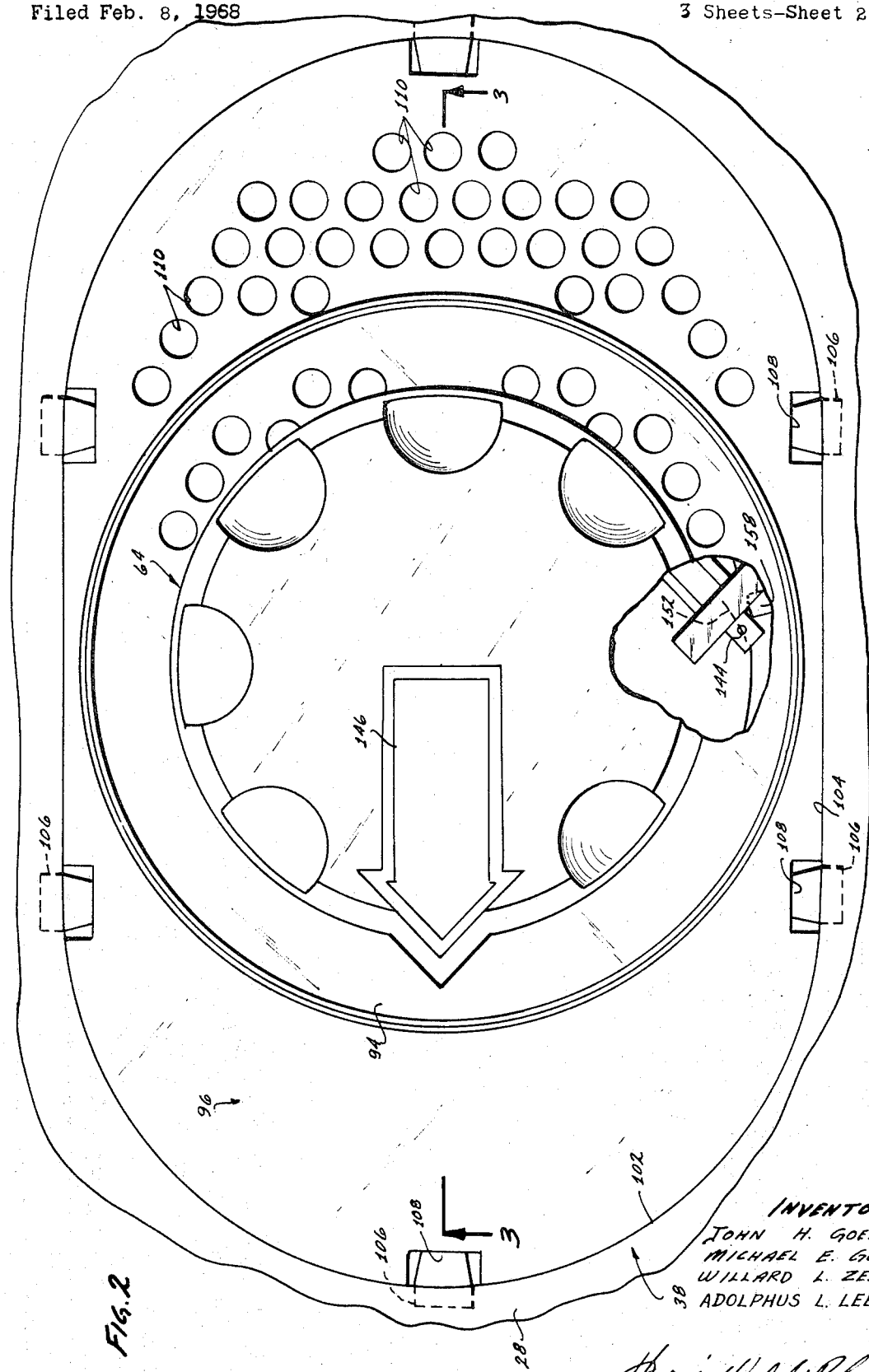
FIG. 2 is an enlarged partial plan view of the book of FIG. 1.

Referring again to the drawings, a sound illustrated book constituting a presently preferred embodiment of the invention, generally designated 10, includes a book 12 having a cover 14 and a plurality of individual pages, such as the two shown at 16 and 18. Pages 16 and 18 may be provided with suitable pictorial representations of real or imaginary things and with printed matter related to the pictorial representations. For example, pages 16 and 18 are shown herein for purposes of illustrations, but not of limitation as containing a pictorial representation of an airplane 20 and the printed matter appearing at 22. The cover 14 and the pages 16 and 18 are each provided with an aperture means 24 having a predetermined location on its associated cover or page so that, when cover 14 and page 16 are closed onto page 18, the several aperture means 24 will be juxtaposed.

Sound illustrated book 10 also includes a simulated book portion 26 having a top wall 28, a bottom wall 30, a pair of side walls 32, 34 and a pair of end walls, like the one shown at 36 in FIG. 1. Simulated book portion 26 serves as a housing for a sound reproducing means 38 including a lower housing half 40 having a bottom wall 42 and an upper housing half 44 having a top wall 46. Sound reproducing means 38 includes a turntable 48 having a hollow spindle 50 non-rotatably connected to a splined shaft 52 having an end 54 journaled in a hollow boss 56 upstanding from bottom wall 42. Shaft 52 includes an intermediate portion 57 journaled in a bushing 58 which may be formed integrally with top wall 46 during a suitable molding operation by which upper housing half 44 is made in one piece. Shaft 52 also includes an upper end 59 having splines 60 non-rotatably receiving a hollow spindle 62 forming an integral part of an indicator means 64 accessible through aperture means 24 for manipulation by a child-user of sound illustrated book 10.

Sound reproducing means 38 also includes a first clutch means 66 having rollers, like the ones shown at 68 in FIG. 3, adapted to prevent rotation of turntable 48 in one direction while leaving it free to rotate in the other direction, all as more fully described in said copending application Ser. No. 452,107. Clutch 66 includes a spring arbor 70 operatively connected to a clock spring 72 and a spring arbor 74 to which a drawstring 76 is connected. Spring 72 may be tensioned by pulling drawstring 76 to rotate spring arbor 70 in the direction which releases turntable 48 from rotation therewith so that drawstring 76 will not have to be pulled against the resistance offered by a governor means 78 connected to turntable 48 by a belt 80. Tensioned spring 72 drives spring arbor 70 in the other direction, when drawstring 76 is released, so that turntable 48 will be rotated thereby. During such rotation of turntable 48, drawstring 76 becomes coiled about string arbor 74 between a first annular flange 82, which is formed integrally with arbor 74 and a second annular flange 84.

Sound reproducing means 38 also includes a second clutch means 86 having a substantially cylindrical portion 88 encompassing hollow spindle 62 and a non-circular flange 90 seated in a matching, non-circular recess 92 provided in a bottom wall portion 94 of an adaptor means 96 affixed to top wall 46 of sound reproducing means 38. Clutch means 86 includes rollers, like the ones shown at 98, adapted to grip spindle 62 for preventing rotation of indicator means 64 in one direction while freeing it for rotation in the other direction. Since undue force exerted on indicator means 64 in an attempt to rotate it in said one direction could dislodge flange 90 from recess 92, flange 90 is provided with a depending, substantially cylindrical pin 100 which is disposed within a suitable aperture (not shown) provided in top wall 46.

Adaptor means 96 may be secured to top wall 46 and includes an elliptical flange 102 adapted to seat in a mating aperture 104 provided in top wall 28 of book portion 26 and retained in position therein by a plurality of snap tabs 106 extending upwardly from a depending skirt 108 carried by flange 102. Top wall 94 of adaptor means 96 is provided with a plurality of apertures 110 communicating with an opening 112, provided in upper housing half 44 above a speaker cone 114 forming part of sound reproducing means 38.

Speaker cone 114 carries a cylindrical collar 116 in which a piston 118 is reciprocably mounted for transmitting vibrations of sonic frequency from a tone arm 120 through the medium of a silicone grease 122 disposed between piston 118 and collar 116. Piston 118 is biased into engagement with tone arm 120 by a compression spring 124 encompassing a post 126 depending from top wall 94 and having a first end 128 bearing against top wall 94 and a second end 130 bearing against the bottom wall portion 132 of piston 118. Collar 116 carries an upstanding shroud 134 having an upper end 136 encompassing an annular rib 138 depending from top wall 94. Shroud 134 serves to prevent any foreign particles entering upper housing half 44 through apertures 110 in adaptor means 96 and the opening 112 in housing 44 from damaging silicone grease 122.

The sound reproducing means 38 also includes a recorded-message carrier means 140 having recorded messages provided thereon in a predetermined sequence and including a separate sound effect characteristic of the pictorial representation on a particular page and a separate message reciting the printed matter on this particular page in book 12. Recorded-message carrier means 140 may comprise a random phonograph record of the type disclosed in said U.S. Pat. No. 3,017,187 and includes a lead-in groove 142 for each sound sequence. A particular lead-in groove 142 may be positioned under a phonograph needle 144 (carried by tone arm 120) by rotating indicator means 64 until a pointer 146 provided thereon is aligned with an indicium means 148 provided in a predetermined angular position adjacent aperture means 24 in page 18, or any other page from book 12 which is in the position shown in FIG. 1 for page 18. For example, recorded-message carrier means 140 may be provided with a sound track 150 having a lead-in groove 152, a first sound-groove portion 153 having an airplane sound recorded thereon, a second portion 154 having the printed matter 22 recorded thereon and a third portion 156 having more airplane sounds recorded thereon. A child-user may open a book 12 to pages 16 and 18 and align pointer 146 with indicium means 148. This positions lead-in groove 152 at the point where needle 144 will drop when drawstring 146 is tensioned to carry tone arm 120 to its returned position against a stop member 158 during the winding of spring 72. When drawstring 176 is released, sound-reproducing means 38 will be actuated playing an airplane sound followed by the printed message 22 and an additional airplane sound. Each page in book 12 corresponding to the page 18 is provided with an indicium means 148 having an angular location with respect to its associated aperture means 24 such that, when indicator means 64 is rotated until pointer 146 is aligned with a particular indicium means 148, the sound-reproducing means 38 will be preconditioned to play the printed message (and suitable sound effects) provided on the page bearing the particular indicium means. Tone arm 120 includes a free end 158 from which needle 144 depends. Free end 158 is provided with a transverse bore 160 receiving drawstring 76 so that frictional engagement of free end 158 with drawstring 76 will cause tone arm 120 to be returned from the inner periphery 162 of recorded-message carrier 140 to the outer periphery 164 thereof when drawstring 76 is tensioned to wind spring 74. Tone arm 120 carries a transverse rib 166 which is engaged by bottom wall 132 of piston 118 for transmitting vibrations from needle 144 to speaker cone 114.

While the particular sound illustrated book herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. In a sound illustrated book having a plurality of pages each bearing pictorial representations of real or imaginary things and printed matter related to said pictorial representations, said pages normally overlying a sound reproducing means, the improvement comprising:

said sound-reproducing means including record means having recorded messages provided thereon representative of the printed matter on the pages in said book;

indicator means connected to said sound-reproducing means for preconditioning said sound-reproducing means to play one of said messages when said sound-reproducing means is energized;

apertures provided in each of a plurality of said pages in juxtaposition with each other when said book is closed, said indicator means being rotatably mounted on said sound reproducing means and being accessible for rotation through said apertures; and indicia means provided on at least some of said pages adjacent their associated aperture, each of said indicia means having an angular location with respect to its associated aperture such that, when said indicator means is rotated into alignment with a particular indicia means, said sound producing means will be preconditioned to play a message representative of the matter printed on at least the page bearing said particular indicia means.

2. An improvement as stated in claim 1 wherein said sound-reproducing means includes a phonograph record of the random-speech type having a separate lead-in groove adjacent the outer periphery thereof for each of said recorded messages, connecting means connecting said indicator means to said phonograph record for moving a predetermined lead-in groove to a predetermined position during preconditioning of said sound-reproducing means.

3. An improvement as stated in claim 2 wherein said sound-reproducing means includes a phonograph needle positionable superjacent said outer periphery of said record and wherein said predetermined lead-in groove is positioned beneath said needle when said sound-reproducing means is preconditioned.

4. An improvement as stated in claim 2 wherein said connecting means includes locking means for preventing rotation of said record in one direction while permitting rotation thereof in an opposite direction.

5. An improvement as stated in claim 1 wherein said sound-reproducing means comprises:

housing means;

a turntable shaft rotatably mounted in said housing means;

a turntable having an upstanding spindle keyed to one end of said shaft;

a spring arbor encompassing said upstanding spindle, said spring arbor having angular slots providing small and large spaces between said arbor and said spindle;

bearing members mounted in said slots for frictional engagement between said arbor and said spindle when said bearing members are positioned in said small spaces and for releasing said spindle when said bearing members are positioned in said large spaces;

a spring connected to said spring arbor in such a manner that said spring will be tensioned when said spring arbor is wound in a first direction, said bearing members moving to said enlarged spaces out of frictional engagement with said spindle when said arbor is turned in said first direction;

means connected to said arbor for turning it in said first direction upon release of which means said spring drives said spring arbor in a second direction opposite from said first direction so that said bearing members come into frictional engagement with said arbor and said spindle resulting in the driving of said turntable;

means for keying said indicator means to the other end of said shaft for rotating said shaft in said second direction to position said turntable;

clutch means connected to said other end of said shaft for preventing rotation of said indicator means in said first direction;

phonograph record means fixedly mounted on said turntable, and said recorded messages being recorded on said phonograph record means in interleaved sound sequences, said sound sequences each having a starting position on the periphery of said record means which is moved to a predetermined position by said indicator means; and means mounted in said housing means for reproducing sound recorded on said phonograph record means.

6. An improvement as stated in claim 5 including sounds characteristic of said pictorial representations provided by said interleaved sound sequences.

7. An improvement as stated in claim 6 wherein a first characteristic sound precedes said recorded messages and a second characteristic sound follows said recorded messages.

References Cited

UNITED STATES PATENTS

| 2,997,306 | 8/1961 | Hicks | 35—8.1 |
| 3,086,297 | 4/1963 | Kantrowitz | 35—35.3 |
| 3,383,114 | 5/1968 | Ryan | 274—2 |

HARRY N. HAROIAN, Primary Examiner

U.S. Cl. X.R.

274—9, 15